United States Patent
Garg et al.

(10) Patent No.: US 9,049,292 B2
(45) Date of Patent: Jun. 2, 2015

(54) AUTHENTICATION TO FACILITATE COMMUNICATION WITH ROAMING DEVICES

(75) Inventors: Ankit Garg, San Jose, CA (US); Lakshmanan Venugopalan, Fremont, CA (US); Tom Weiliang Chang, Saratoga, CA (US); Rahul Malegaonkar, San Jose, CA (US); Basava Chandra Mulpuri, Milpatas, CA (US)

(73) Assignee: Cisco Technology, Inc., San Jose, CA (US)

( * ) Notice: Subject to any disclaimer, the term of this patent is extended or adjusted under 35 U.S.C. 154(b) by 893 days.

(21) Appl. No.: 12/712,754

(22) Filed: Feb. 25, 2010

(65) Prior Publication Data

US 2011/0207454 A1 Aug. 25, 2011

(51) Int. Cl.
*H04M 3/42* (2006.01)
*H04W 8/06* (2009.01)
*H04W 12/06* (2009.01)

(52) U.S. Cl.
CPC ............ *H04M 3/42229* (2013.01); *H04W 8/06* (2013.01); *H04W 12/06* (2013.01); *H04M 2207/18* (2013.01)

(58) Field of Classification Search
CPC ... H04W 8/06; H04W 12/06; H04M 3/42229; H04M 2207/18

USPC .............................................. 455/411, 432.1
See application file for complete search history.

(56) References Cited

U.S. PATENT DOCUMENTS

| | | | |
|---|---|---|---|
| 6,285,871 B1 * | 9/2001 | Daniels ........................ | 455/411 |
| 7,292,558 B2 * | 11/2007 | Adrangi et al. ............... | 370/338 |
| 7,627,656 B1 | 12/2009 | Anand et al. | |
| RE41,075 E * | 1/2010 | Adamany et al. ............. | 455/410 |
| 7,912,504 B2 * | 3/2011 | Bjorkner ....................... | 455/558 |
| 8,127,001 B1 * | 2/2012 | Sylvain ......................... | 709/224 |
| 2008/0098463 A1 * | 4/2008 | Wikman .......................... | 726/5 |
| 2008/0209213 A1 * | 8/2008 | Astrand et al. ................ | 713/168 |
| 2010/0128709 A1 * | 5/2010 | Liu et al. ....................... | 370/338 |

* cited by examiner

*Primary Examiner* — Dwayne Bost
*Assistant Examiner* — Larry Sternbane (57) ABSTRACT

In an embodiment, a mobile device that is configured to receive calls on a first telephone network via a first telephone number is configured to receive calls on a second telephone network via a second telephone number. A subscriber interface module (SIM) is installed into the mobile device enabling the mobile device to communicate with the second telephone network. A username, password, and telephone number for the second network are obtained. The mobile device registers the username, password, telephone number for the first network and telephone number for the second network with the first telephone network. A telephone call is received from the first telephone network and a personal identification code is employed to verify the registration.

17 Claims, 5 Drawing Sheets

AUTHENTICATION TO FACILITATE COMMUNICATION WITH ROAMING DEVICES

TECHNICAL FIELD

The present disclosure relates generally to mobile communications.

BACKGROUND

When an enterprise mobile user travels to a new country, the user may either use the same provider and be a roaming user in the new country, or put in a local Subscriber Identity Module (SIM) card for the country being visited. Roaming in the new country may result in increased cost for receiving and/or making calls. In addition data channel costs while roaming can be high, and any calls made via the enterprise will be routed through the enterprise call processing server of the country where the user is registered. Using a local SIM card can also be problematic. For example, the number on the SIM card may not be recognized by the enterprise. Authenticating the user in the new country may also be a problem, as well as utilizing an enterprise call processing server in the new country, providing enterprise features, and call routing.

BRIEF DESCRIPTION OF THE DRAWINGS

The accompanying drawings incorporated herein and forming a part of the specification illustrate the examples embodiments.

OVERVIEW OF EXAMPLE EMBODIMENTS

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus comprising a transceiver configured to send and receive data, and logic coupled to the transceiver and configured to send and receive data via the transceiver. The logic is configured to receive data representative of a first telephone number and a second telephone number associated with a mobile device. The logic initiates a telephone call to the second telephone number to the mobile device. The logic receives data representative of a personal identification code from the mobile device after establishing the telephone call with the mobile device via the second telephone number. The logic is responsive to verify the data representative of the personal identification code from the mobile device matches a predetermined personal identification code. The logic stores an association of the second telephone number with the first telephone number responsive to verifying the data representative of the personal identification code from the mobile device matches the predetermined personal identification code.

In accordance with an example embodiment, there is disclosed herein an apparatus comprising a transceiver configured to send and receive data, a user interface, at least one Subscriber Identity Module card configured to communicate with a second telephone network via the transceiver, and logic coupled to the transceiver, user interface, and Subscriber Identity Module card, the logic is configured to send and receive data via the transceiver. The logic is configured to receive data representative of a username, password, and a second telephone number via the user interface. The logic is configured to send the data representative of a first telephone number, username, password, and second telephone number to a mobility server coupled to a first telephone network via the transceiver. The logic is configured to receive a telephone call from the first telephone network and sends data representative of a personal identification code responsive to receiving the telephone call.

In accordance with an example embodiment, there is disclosed herein a method, comprising obtaining a username, password, first telephone number and second telephone number associated with a mobile device. The username, password, first telephone number and second telephone number are sent to a mobility server associated with a first telephone network. The mobility server verifies the username and password with the first telephone number. The mobility server sends a registration message to a device on a first telephone network, the registration message comprising the first telephone number and the second telephone number responsive to verifying the username and password with the first telephone number. A telephone call is established between the device on the first telephone network and the mobile device, wherein the mobile device is coupled to a second telephone network. The mobile device transmits a personal identification number associated with the mobile device. The personal identification number is verified, and an association between the second number and first telephone number is stored responsive to verifying the personal identification number.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In accordance with an example embodiment, when an enterprise mobile user travels to another country the user can replace the Subscriber Identity Module "SIM" card in a phone (for example a Global System for Mobile Communications "GSM" compatible phone). In other embodiments, the user may replace the SIM card for various other reasons such as cost savings. As another example, a user who is running out of minutes on a prepaid account may desire to replace the SIM card with another card that has more minutes. The user can use a local SIM card and number to make/receive calls.

In an example embodiment, after putting in the new SIM card the mobility client is executed. The mobility client prompts for user-name and password, which the mobility server uses to authenticate the user.

The user provisions the new roaming number on the mobility client. The mobility client running on the mobile phone sends a Session Initiation Protocol (SIP) Register message to the mobility server with the user's original mobile number and the new mobile number. In an example embodiment, the new mobile number is sent in the Extensible Mark Language/Session Description Protocol "XML/SDP" data of the SIP Register Message.

The mobility server authenticates the user. The mobility server sends the SIP Registration to the Enterprise Call Server responsive to authenticating the user.

The enterprise call server parses the SIP Register Message and obtains the original mobile number as well as the roaming mobile number. Since the roaming mobile number is present the server understands that the user is trying to register with a roaming mobile number and is currently outside its home territory. The enterprise call server then places a server call to the roaming number. Since the roaming number is a globalized number with a Country Code, the call can be sent using the least cost route.

The user then gets a call from the server. After accepting the call user enters in the roaming access code or pin digits using the mobile phone. The PIN entered by the user is matched against the roaming access code or pin configured for the user. Once the call server authenticates the roaming access code, the user is registered successfully. If the user enters the wrong roaming access code or pin the user (or phone) can be locked out for a predetermined time duration.

When a caller from the enterprise tries to reach the mobile user while roaming, the desk phone of the enterprise mobile user is dialed and via Single Number Reach functionality, the mobile phone can be reached. Since the home location's call server is aware that enterprise mobile user is roaming and has the roaming mobile number, the home location's call server can route the call based on a least cost function. For example, if the roaming number has a United Kingdom (UK) country code and the home enterprise call server has a trunk (SIP, H323 etc.) to another call server in UK the call is routed from UK call server.

In an example embodiment, the mobile device may employ a multiplicity of SIM cards. For example, a user can just add another local SIM card for a country the user will be visiting. By using an example embodiment described herein, the user can make and use telephone calls at the foreign country via the phone number associated with the SIM card for the foreign country, while phone calls initiated at the home country can be directed to the phone number associated with the home country.

Figure 1:
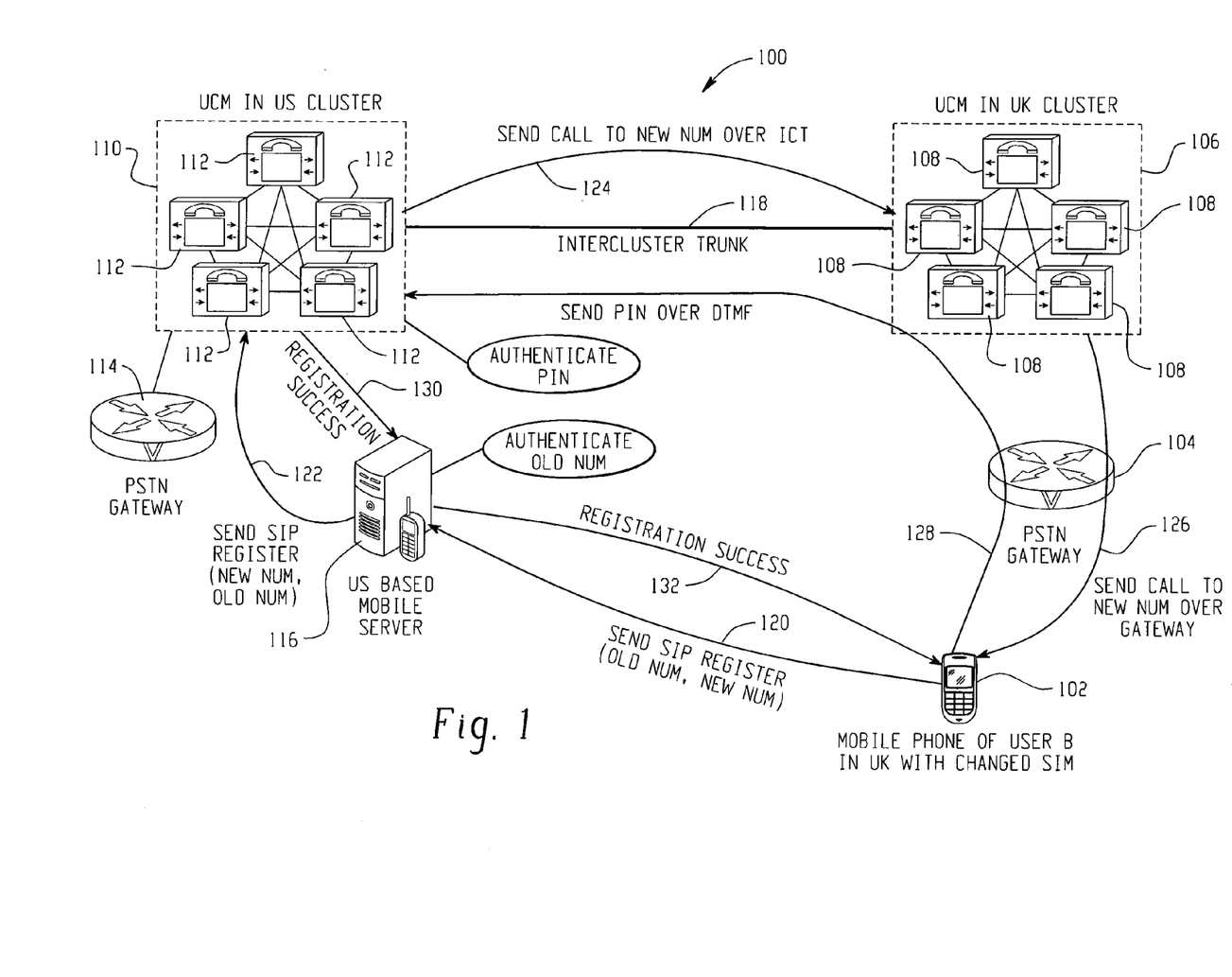
FIG. 1 illustrates an example of a system and signals enabling a mobile device with a first telephone number for a first network to register a second telephone with a second telephone network.

Referring now to FIG. 1, there is illustrated a system 100 configured to perform registration and authentication in accordance with an example embodiment. Mobile device 102 is present coupled to a foreign network (in the illustrated example the network is in the United Kingdom "UK" but those skilled in the art can readily appreciate that the principles described herein can be applied to any foreign network) via Packet Switched Telephone Network (PSTN) gateway 104. PSTN 104 is coupled to a cluster 106 of telephone call managers 108. The foreign network is coupled to the home network cluster 110 for mobile device 102 (which in this example is in the United States "US" but those skilled in the art should readily appreciate that the home network may be in any country) via an Intercluster Trunk 118. In other example embodiments, other means of coupling the foreign network to the home network may be employed such as Internet Protocol (IP) networks, etc. Home network cluster 110 suitably comprises a plurality of call managers 112. Home network cluster 110 is coupled to PSTN gateway 114, which mobile device 102 can employ to connect to the home network cluster when mobile device 102 is not roaming on the foreign network. Mobility server 116 is coupled to home network cluster 110 and facilitates the roaming of mobile device 102 as will be described in an example embodiment herein.

In accordance with an example embodiment, mobile device 102 is equipped with a SIM for communicating with the foreign network. In order to send/receive telephone calls on the foreign telephone network mobile device 102 registers the telephone number it will be using for communicating with the foreign network with the home network. To initiate the process, mobile device 102 sends a message (for example a SIP Register message) 120 to mobility server 116. Message 120 may suitably comprise a username and password received by mobile device 120.

In an example embodiment, mobility server 116 authenticates a user associated with mobile device 102. The user may be authenticated based on the telephone number assigned to mobile device 102 by the home network.

Mobility server 116 sends message 122 to home network cluster 110 which is processed by one of the plurality of call mangers 112. In an example embodiment, message 112 is a SIP Register message suitably comprising the telephone number for mobile device 102 associated with the home network (or old telephone network) and the telephone number mobile device 102 will be using on the foreign network (or new number).

One of the plurality of call managers 112 places telephone call 124 to the new telephone number associated with mobile device 102 on the foreign network. In an example embodiment, the telephone number for the foreign network (or new telephone number) is a globalized number with country code. Telephone call 124 can be made using a least cost route, for example via Intercluster trunk 118. Call cluster 106 establishes the call with mobile device 102 as represented by signal 126.

The call is answered at mobile device 102. In an example embodiment, a user inputs into a user interface associated with mobile device 102 an authentication code (such as a person identification number or "PIN").

The authentication code is transmitted to home network cluster 110 as represented by signal 128. In an example embodiment, the authentication code transmitted to home network cluster 110 in-band via DTMF signals. The PIN transmitted by mobile device 102 is compared with a predetermined PIN established for a user associated with mobile device 102. If the PIN matches, signal 130 is sent from home network cluster 110 to mobility server 116 indicating registration was successful. Mobility server 116 then sends signal 132 to mobile device 132 indicating registration of the new number was successful. If, however, the PIN does not match, the user may be allowed to re-enter the PIN. In particular embodiments, the user associated with mobile device 102 and/or mobile device 102 may be locked out of the telephone network or a predetermined time period after a predetermined number of attempts. For example, if the user enters an incorrect PIN 3 times the network may lock the user out for eight hours.

Figure 2:
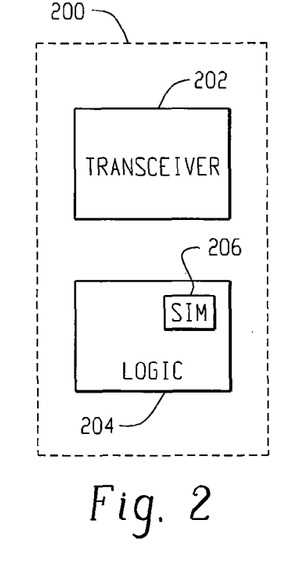
FIG. 2 illustrates a mobile device with a single subscriber interface module (SIM) configured to implement an example embodiment.

Referring to FIG. 2, there is illustrated an apparatus 200 suitable for implementing mobile device 102. Apparatus 200 comprises a transceiver 202, logic 204 for performing the functionality described herein and a SIM card 206. Although the example embodiments described herein are directed to a wireless transceiver, those skilled in the art should readily appreciate that transceiver 202 may be a wired and/or wireless transceiver capable of sending signals wirelessly (e.g., via radio signals, optical signals, etc. or over a wired interface. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions. Logic 204 is configured to send and receive data via transceiver 202.

In an example embodiment, apparatus 200 has a first telephone number associated with a first telephone network (e.g., a home telephone network). Logic 204 is configured to receive data representative of a username, password, and a second telephone number for communicating on a second telephone network. via a user interface (not shown, see e.g., FIG. 5). Logic 204 is configured to send the data representative of a first telephone number, username, password, and second telephone number to a mobility server coupled to a first telephone network via transceiver 202. Logic 202 is configured to receive a telephone call from the first telephone network and sends data representative of a personal identification code responsive to receiving the telephone call. The personal identification code may be a PIN number entered by an associated user via a user interface and transmitted in-band to the mobility server. In an example embodiment, logic 202 is configured to send the data representative of the personal identification code using in-band via Dual Tone Multi-Frequency signals. Logic 202 can be configured to receive a registration success message from the mobility server on home network indicating that registration of the second telephone number was successful.

Figure 3:
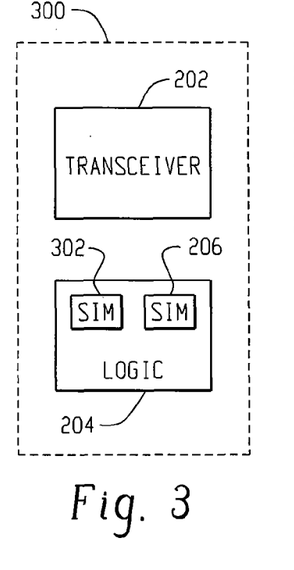
FIG. 3 illustrates a mobile device with multiple SIMs configured to implement an example embodiment.

FIG. 3 illustrates an example of an apparatus 300 suitably comprising a second SIM card 302 that can be employed for implementing mobile device 102. In this embodiment, SIM card 206 can be employed by mobile device 300 to communicate with the home network (for example while in the US) and SIM card 302 can be used to communicate with the foreign network (for example while in the UK).

Figure 4:
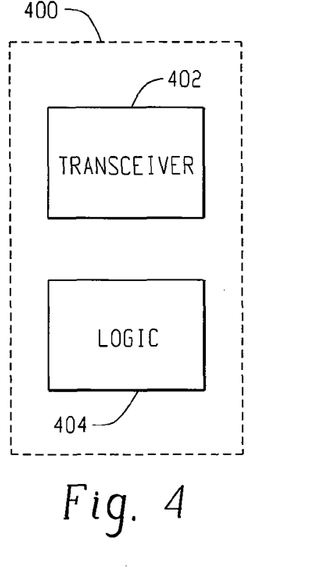
FIG. 4 illustrates an example of a call manager configured to implement an example embodiment.

FIG. 4 illustrates an example of an apparatus 400 that can be employed for implementing any of call managers 108, 112 and/or mobility server 116. Apparatus 400 comprises a transceiver 402 configured to send and/or receive signals from external devices and logic 404 for implementing the functionality of these devices. Logic 404 is coupled to transceiver 402 and is configured to send and/or receive data via transceiver 402.

In an example embodiment, logic 404 is configured to receive data representative of a first telephone number and a second telephone number associated with a mobile device (for example mobile device 102 in FIG. 1). Logic 404 initiates a telephone call to the mobile device using the second telephone. In some embodiments, the telephone call may be made be a device communicatively coupled to apparatus 400. Logic 404 receives data representative of a personal identification code from the mobile device after establishing the telephone call with the mobile device via the second telephone number and verifies the data representative of the personal identification code from the mobile device matches a predetermined personal identification code. Logic 404 logic stores an association of the second telephone number with the first telephone number responsive to verifying the data representative of the personal identification code from the mobile device matches the predetermined personal identification code.

In an example embodiment, the data representative of the first telephone number and second telephone number is received in a Session Initiation Protocol (SIP) compatible message. For example, the data may be received via a SIP Register message. In particular embodiments, the data representative of a username and password is also received.

In an example embodiment, the call to the mobile device is routed through a foreign agent. Logic 404 may determine a least cost path to the foreign agent. For example the call may be routed through an Intercluster trunk to the foreign agent. As another example, the call may be routed through an Internet Protocol network.

In an example embodiment, the data representative of the personal code is received in-band. In particular embodiments, the data is received via Dual Tone Multi-Frequency signals.

In an example embodiment, where apparatus 400 is employed to implement a call server, the data representative of the first telephone number and the second telephone number associated with a mobile device is received from a mobility server. The data may be received in a SIP Register compatible format.

In an example embodiment, logic 404 is configured to send a registration success message to the mobility server responsive to verifying the data representative of the personal identification code from the mobile device matches the predetermined personal identification code. This message may be sent in a SIP compatible format or any suitable format.

In an example embodiment, logic 404 is configured to lock out the mobile device responsive to verification of the data representative of the personal identification code from the mobile device failing more than a predetermined number of times. For example, after three tries the mobile device can be locked out for a predetermined number of minutes.

Figure 5:
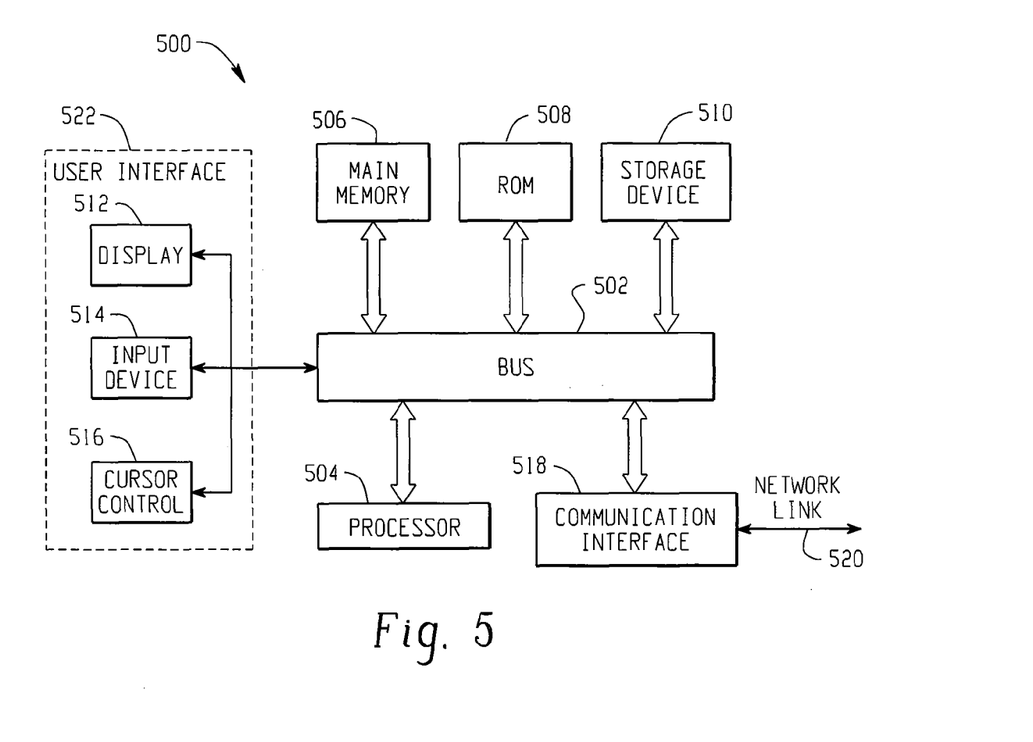
FIG. 5 illustrates an example of a computer system upon which an example embodiment may be implemented.

In an example embodiment, for which a more detailed description will be provided in FIG. 5 infra, logic 404 is responsive to receiving a telephone call directed to the first telephone number to establish the call with the second telephone number. For example logic 404 may route the call via an Intercluster Trunk to a foreign network, where the second telephone number is associated with a foreign telephone network. In particular embodiments, logic 404 is further configured to concurrently route the phone call to a second device associated with the first telephone number.

FIG. 5 illustrates an example of a computer system 500 upon which an example embodiment may be implemented. Computer system 500 may be employed to implement call managers 108, 110, mobility server 116, and/or mobile device 102 in FIG. 1. Computer system 500 is also suitable for implementing logic 204 (FIGS. 2) & 3 and/or logic 404 (FIG. 4).

Computer system 500 includes a bus 502 or other communication mechanism for communicating information and a processor 504 coupled with bus 502 for processing information. Computer system 500 also includes a main memory 506, such as random access memory (RAM) or other dynamic storage device coupled to bus 502 for storing information and instructions to be executed by processor 504. Main memory 506 also may be used for storing a temporary variable or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

In an example embodiment, computer system 500 further comprises a user interface 522, which may include a display 512, input device 514 and/or cursor control 516. Display 512 may be any suitable device such as a cathode ray tube (CRT) or liquid crystal display (LCD), for displaying information to a computer user. An input device 514, such as a keyboard including alphanumeric and other keys is coupled to bus 502 for communicating information and command selections to processor 504. Another type of user input device is cursor control 516, such as a mouse, a trackball, cursor direction keys and/or a touchscreen for communicating direction information and command selections to processor 504 and for controlling cursor movement on display 512. This input device typically has two degrees of freedom in two axes, a first axis (e.g. x) and a second axis (e.g. y) that allows the device to specify positions in a plane.

An aspect of the example embodiment is related to the use of computer system 500 for registering and/or authenticating a roaming mobile user. According to an example embodiment, registering and/or authenticating a roaming mobile user is provided by computer system 500 in response to processor 504 executing one or more sequences of one or more instructions contained in main memory 506. Such instructions may be read into main memory 506 from another computer-readable medium, such as storage device 510. Execution of the sequence of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 504 for execution. Such a medium may take many forms, including but not limited to non-volatile media, and volatile media. Non-volatile media include for example optical or magnetic disks, such as storage device 510. Volatile media include dynamic memory such as main memory 506. As used herein, tangible media may include volatile and non-volatile media. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 504 for execution. For example, the instructions may initially be borne on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506 from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling computer system 500 to a network link 520. Network link 520 allows computer system 500 to communicate with other external devices. Computer system 500 can send messages and receive data, including program codes, through the network(s), network link 520, and communication interface 518. In some embodiments, network link 520 is a wireless link while in other embodiments network link 520 is a wired link. Communication interface 518 provides the appropriate interface for network link 520. For example, if computer system 500 is employed to implement mobile device 102 (FIG. 1), network link 520 is a wireless link, whereas if computer system 500 is employed to implement mobility server 116 (FIG. 1) network link 520 may be either a wireless or wired link. In particular embodiments, computer system 500 may suitably comprise a plurality of communication interfaces 518. For example, one communication interface 518 may be used for a data channel and/or a channel to setup telephone calls while a second communication interface 518 may be employed to send/receive data for a voice call.

For example, communication interface 518 may be a local area network (LAN) card to provide a data communication connection to a compatible LAN. As another example, communication interface 518 may be an integrated services digital network (ISDN) card or a modem to provide a data communication connection to a corresponding type of telephone line. Wireless links may also be implemented. In any such implementation, communication interface 518 sends and receives electrical, electromagnetic, or optical signals that carry digital data streams representing various types of information.

Figure 6:
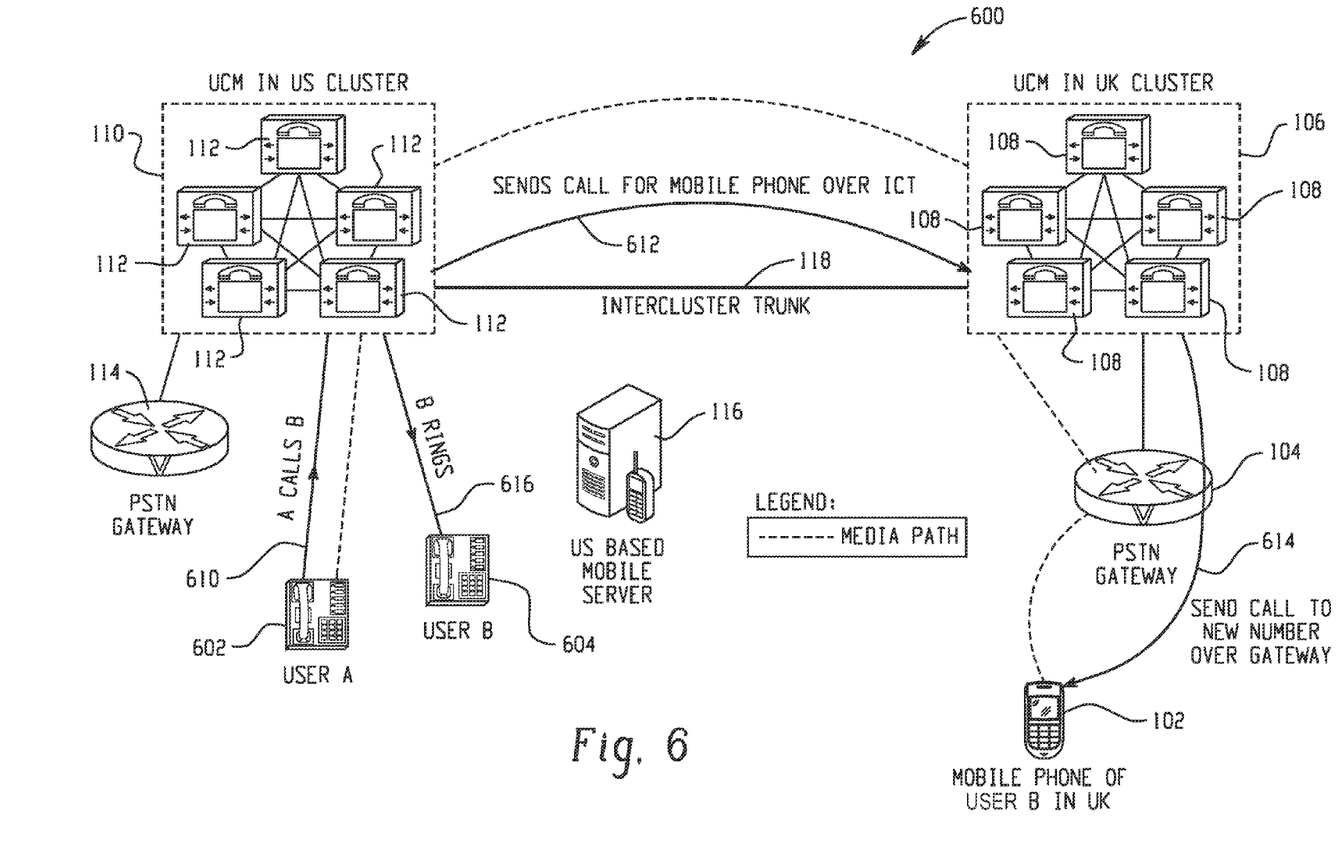
FIG. 6 illustrates an example signal diagram for routing a telephone call received for the first telephone number on a first network to the mobile device while the mobile device is using a second telephone number associated with a second telephone network.

FIG. 6 illustrates an example signal diagram 600 for routing a telephone call received for the first telephone number on a first network to mobile device 102 while mobile device 102 is using a second telephone number associated with a second telephone network. In this example, it is assumed that mobile device 102 has registered the second telephone number (or "new" telephone number) with mobility server 116 and home call cluster 110, for example as was described in FIG. 1 supra.

In the illustrated example, a telephone call is placed via telephone 602. The telephone number dialed in this call would be the first telephone number for mobile device 102 (or the "old" number which is the number user device uses while associated with call cluster 110. Because mobility server 116 has registered the new telephone number with home call cluster 110, the call manager 112 that is handling the call from telephone 602 can route the call to mobile device 102 by placing a call to the second telephone number across ICM trunk 118 to foreign call cluster 106. Foreign call cluster then sets up the call with mobile device 102.

Figure 7:
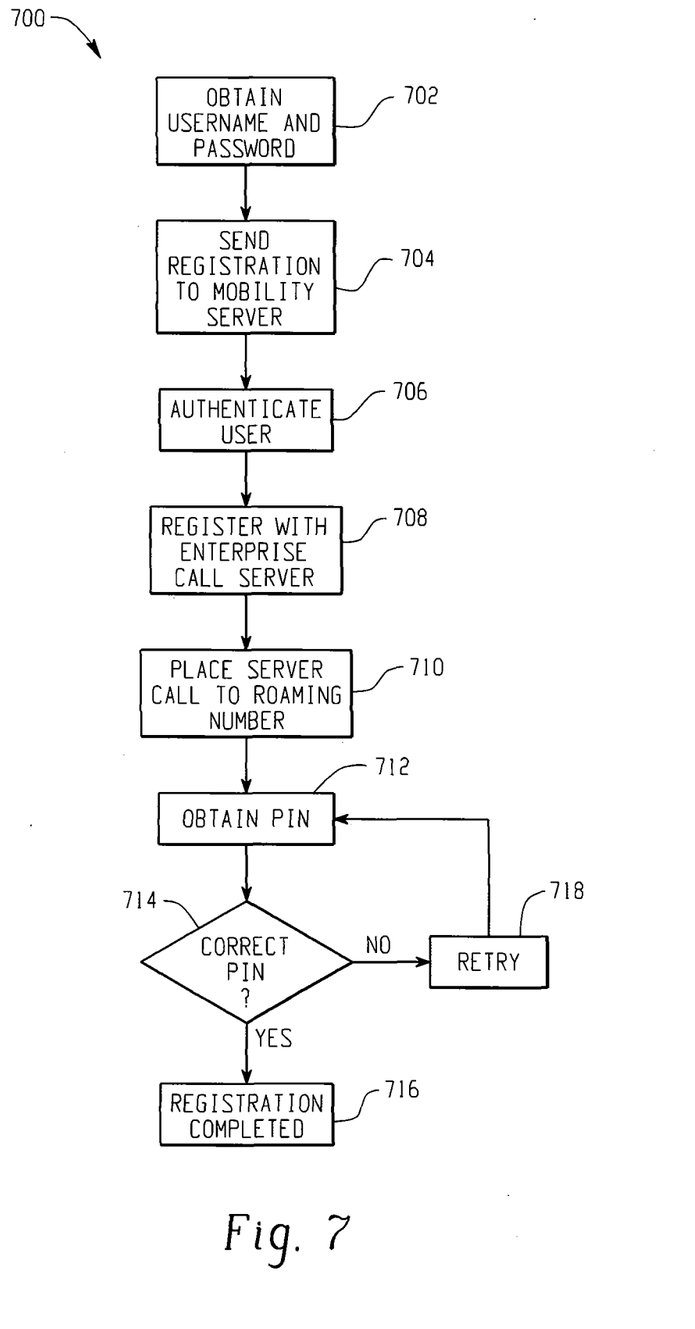
FIG. 7 is an example of a method for authenticating and registering a roaming mobile user associated with a first network with a second network.
Figure 8:
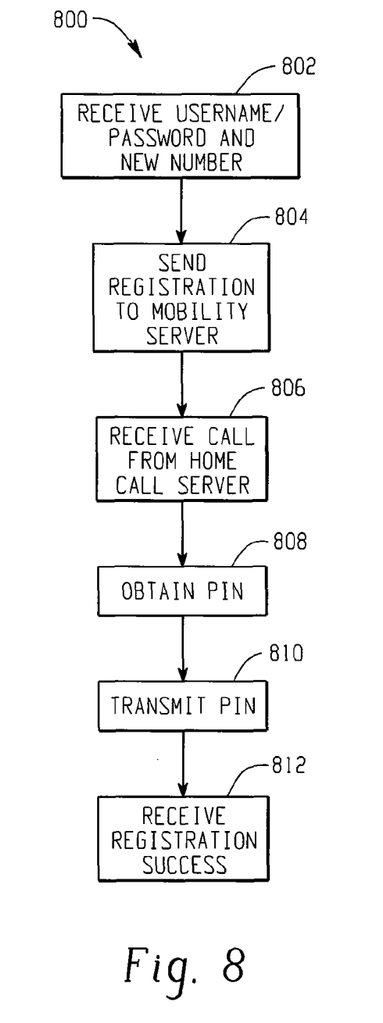
FIG. 8 is an example of a method performed by a mobile device for authenticating and registering a roaming mobile user associated with a first network with a second network.
Figure 9:
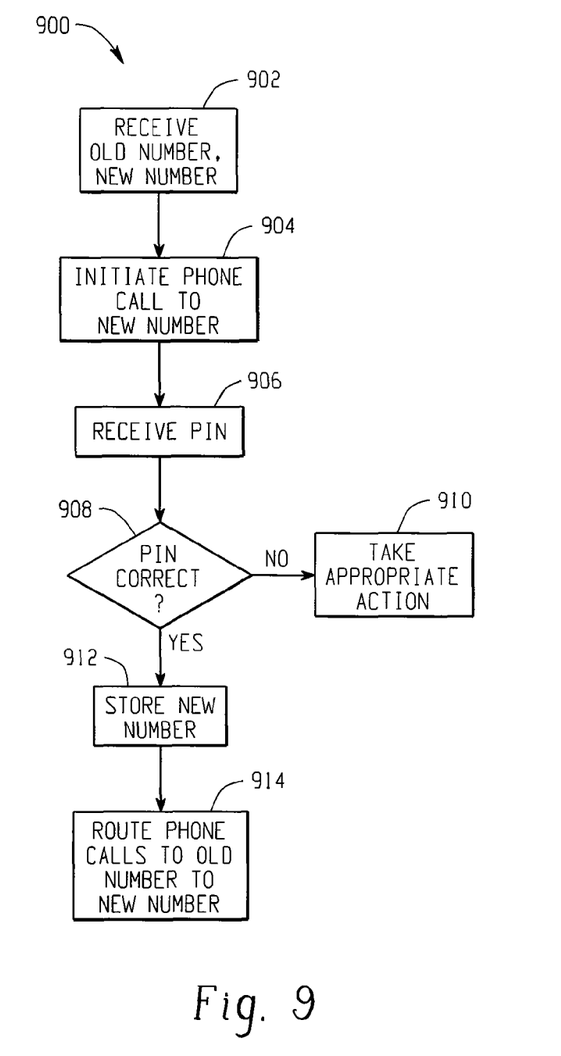
FIG. 9 is an example of a method performed by a call manager on a home network for authenticating and registering a roaming mobile user associated with a first network with a second network.

In view of the foregoing structural and functional features described above, methodologies in accordance with example embodiments will be better appreciated with reference to FIGS. 7-9. While, for purposes of simplicity of explanation, the methodologies of FIGS. 7-9 are shown and described as executing serially, it is to be understood and appreciated that the example embodiments are not limited by the illustrated orders, as some aspects could occur in different orders and/or concurrently with other aspects from that shown and described herein. Moreover, not all illustrated features may be required to implement an example embodiment. The methodologies described herein are suitably adapted to be implemented in hardware, software, or a combination thereof.

FIG. 7 is an example of a method 700 for authenticating and registering a roaming mobile user associated with a first network with a second network. Method 700 is suitable for implementing on a system comprising a plurality of networks such as network 100 illustrated in FIG. 1.

At 702, a SIM card is placed in a mobile device (for example mobile device 102 in FIG. 1). The mobile device is then booted up, and a client for the mobile device is initiated. The client obtains a username and password via a user interface from a user associated with the mobile device. In particular embodiments, a telephone network for a foreign (second) network is obtained.

At 704, the mobile device sends a registration message to a mobility server on the home network. The registration may suitably comprise the username, password, second (new) telephone number, and/or a combination of the aforementioned parameters. In an example embodiment, the registration message is a SIP Registration message. In an example embodiment, the new mobile number is sent contained in the XML/SDP of a SIP register message.

At 706, the mobility authenticates the user. In an example embodiment, the mobility server verifies the username/password correspond to the old (home) telephone network for the mobile device.

At 708, the mobility server sends a registration message to an enterprise call server on the home network. In an example embodiment, the mobility server sends a SIP Register message to the enterprise server. The SIP Register message may contain the new number and the old telephone number.

At 710, the enterprise call server parses the SIP register message and obtains the original (old) telephone number and the roaming (new) telephone number. Since the roaming number is present in the register message, the server understands that the user is attempting to register the roaming (new) telephone number and is currently outside the home network. The enterprise call server places a server call to the roaming number. Since the roaming number is a globalized number with a Country Code the call can be sent using a least cost route.

At 712, the mobile device gets a call from the server. After accepting the call, a user associated with the mobile device enters a roaming access code, such as a PIN. In an example embodiment, the code is entered using the digits on the mobile device's telephone keypad. The code can be sent from the mobile device to the server using DTMF signals.

At 714, the server determines whether the authentication code (e.g., PIN) is correct. If the correct authentication code was received (YES), at 716 the server registers the roaming (new) number. In an example embodiment, the server also sends a registration success message to the mobility server.

If, at 714, the determination is made that the wrong authentication code was entered (NO), at 718 the user may be allowed to retry. If so, at 712 the user is prompted to enter the authentication code. In an example embodiment, the number of attempts for entering the authentication code may be limited. For example, if the user enters the wrong code three times the mobile device can be locked out of the network for a predetermined time period (e.g., eight hours).

FIG. 8 is an example of a method 800 performed by a mobile device for authenticating and registering a roaming mobile user associated with a first network with a second network. Method 800 may be performed by a user after installing a new SIM card into the mobile device to register a new (roaming) telephone number with a home network.

At 802, the mobile device receives data representative of a username, password, and the new (roaming) telephone number. In an example embodiment, the data representative of a username, password, and new number are received via a user interface associated with the mobile device. For example, the mobile device may suitably comprise an alphanumeric keypad and/or a touchscreen.

At 804, the data representative of a username, password and new telephone number are sent to a mobility server. The mobility server is associated with the home network for the mobile device. In an example embodiment, the data is sent using a SIP Register message.

At 806, the mobile device receives a call from an enterprise server on the home network. In an example embodiment, the call is received on the roaming (new) telephone number. The call is routed through a foreign network communicatively coupled with the mobile device.

At 808, the mobile device receives an authentication code (e.g., a PIN). In an example embodiment, authentication code may be received via a user interface associated with the mobile device. For example, the authentication code may be received via an alphanumeric keypad or touchscreen.

At 810, the mobile device transmits the authentication code. In an example embodiment, the authentication code is transmitted in-band via DTMF signals.

At 812, the mobile device receives a registration success message. In an example embodiment, the registration success message is received from the mobility server. In particular embodiments, the mobile device may output/display a message informing the user that registration of the new (roaming) number was successful.

FIG. 9 is an example of a method 900 performed by a call manager on a home network for authenticating and registering a roaming mobile user associated with a first network with a second network. In an example embodiment, method 900 is performed by an enterprise call server (or call manager, for example a Unified Call Manager (UCM) or Cisco Unified Communications Manager (CUCM) available from Cisco Systems, Inc., 170 West Tasman Dr., San Jose, Calif. 95134.

At 902, a message is received comprising the old (home) telephone number and new (roaming) telephone number for the mobile device. In an example embodiment, the message is a SIP Register message. In particular embodiments, the message is received from a mobility server.

At 904, the server determines from the message that the mobile device is attempting to register the new (roaming) number. In response, the server initiates a telephone call with the mobile device. The telephone call is directed to the new (roaming) number on the foreign network. The call may use a least call route, such as an IP trunk.

At 906, the server receives an authentication node from the mobile device. In an example embodiment, the authentication code is a PIN that is received in-band via DTMF signals.

At 908, the server verifies the authentication code is correct. If the code is not correct (NO), at 910 the server performs a predetermined action. For example, the server may send a signal to the mobile device indicating the authentication code was in correct. The server may elect to receive a new authentication code from the mobile device if less than a predetermined number of attempts have been made (for example less than ten attempts). If too many attempts have been made, the server may lock out the mobile device (for example for eight hours).

If, at 908, the PIN number is determined to be correct (YES) at 912 the new (roaming) telephone number for the mobile device is stored. In particular embodiments, the server may also send a registration success message to the mobility server and/or mobile device.

As illustrated at 914, telephone calls received for the mobile device which were dialed to the old (original or home network) telephone number are routed to the new (roaming) number on the foreign network. The server may employ a least cost route to the foreign network.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
   a transceiver configured to send and receive data; and
   logic coupled with the transceiver and configured to send and receive the data via the transceiver;
   wherein the logic is configured to receive data representative of a username, a password, a first telephone number local to an associated mobile device in a first telephone network, and a second telephone number of the associated mobile device local to the associated mobile device in a second telephone network different than the first telephone network;
   wherein the logic authenticates the username and password with the first telephone number;
   wherein the logic initiates a telephone call to the second telephone number to the associated mobile device responsive to authenticating the username and password with the first telephone number;
   wherein the logic receives data representative of a personal identification code from the associated mobile device in band using a Dual Tone Multi-Frequency signal after establishing the telephone call with the mobile device via the second telephone number;
   wherein the logic is responsive to verify the data representative of the personal identification code from the associated mobile device matches a predetermined personal identification code;
   wherein the logic stores an association of the second telephone number with the first telephone number responsive to verifying the data representative of the personal identification code from the associated mobile device matches the predetermined personal identification code; and
   wherein the logic is responsive, after the association of the second telephone number with the first telephone number, to receive a telephone call on the first telephone network for the associated mobile device using the first telephone number local to the first telephone network, and to direct the telephone call to an associated call server of the second telephone network for calling the associated mobile device by the associated call server using the second telephone number local to the second telephone network.

2. The apparatus of claim 1, wherein the data representative of the first telephone number and second telephone number is received in a Session Initiation Protocol compatible message.

3. The apparatus of claim 1, wherein the call to the associated mobile device is routed through a foreign agent.

4. The apparatus of claim 3, wherein the logic determines a least cost path to the foreign agent.

5. The apparatus of claim 3, wherein the call is routed through an Internet Protocol (IP) trunk to the foreign agent.

6. The apparatus of claim 1, wherein the data representative of the first telephone number and the second telephone number associated with the associated mobile device is received from a mobility server.

7. The apparatus of claim 6, wherein the logic is further configured to send a registration success message to the mobility server responsive to verifying the data representative of the personal identification code from the associated mobile device matches the predetermined personal identification code.

8. The apparatus of claim 1, wherein the logic is further configured to lock out the associated mobile device responsive to verification of the data representative of the personal identification code from the associated mobile device failing more than a predetermined number of times.

9. The apparatus of claim 1, wherein the logic is responsive to receiving a telephone call directed to the first telephone number to establish the call with the second telephone number.

10. The apparatus of claim 1, wherein the second telephone number is associated with a foreign telephone network;
    wherein the logic is configured to route the telephone call directed to the first telephone number to the second telephone number via the foreign telephone network.

11. The apparatus of claim 10, wherein the logic is further configured to concurrently route the phone call to a second device associated with the first telephone number.

12. An apparatus, comprising:
    a transceiver configured to send and receive data;
    a user interface;
    at least one Subscriber Identity Module card configured to communicate with a second telephone network via the transceiver using a second telephone number local to the second telephone network; and
    logic coupled with the transceiver, the user interface, and the Subscriber Identity Module card, the logic being configured to send and receive data via the transceiver;
    wherein the logic is configured to receive, via the user interface, data representative of a username, a password associated with a first telephone number local to a first telephone network, and the second telephone number local to the second telephone network;
    wherein the logic is configured to send the data representative of the first telephone number, the username and the password associated with the first telephone number, and the second telephone number to a mobility server coupled with the first telephone network via the transceiver;

wherein the logic is configured to receive a telephone call directed to the second telephone number, and send data representative of a personal identification code associated with the username in-band using a Dual Tone Multi-Frequency signal responsive to receiving the telephone call; and wherein the logic is responsive, after sending the data representative of the personal identification code, to receive a telephone call on the second telephone number via the second telephone network from an associated device using the first telephone number directed to the first telephone network.

13. The apparatus of claim 12, wherein the logic is configured to receive the data representative of the personal identification code via the user interface.

14. The apparatus of claim 13, wherein the logic is configured to receive a registration success message from the mobility server.

15. A method, comprising:

obtaining a first telephone number local to a first telephone network, a username and password associated with the first telephone number and second telephone number local to a second telephone network associated with a mobile device;

sending the username, the password, the first telephone number and the second telephone number to a mobility server associated with the first telephone network;

authenticating, by the mobility server, the username and the password with the first telephone number;

sending a registration message to a device on the first telephone network, the registration message comprising the first telephone number and the second telephone number responsive to authenticating the username and the password with the first telephone number;

establishing a telephone call between the device on the first telephone network and the mobile device, wherein the mobile device is coupled with the second telephone network via the second telephone number;

receiving in band using a Dual Tone Multi-Frequency signal a personal identification number associated with the mobile device;

verifying the personal identification number;

storing an association between the second telephone number and the first telephone number responsive to verifying the personal identification number; and initiating, after authentication, a telephone call between the mobile device associated with a remote cluster associated with the second telephone network using the telephone number local to the second telephone network and another device associated with a local cluster associated with the first telephone network via a communication link between the clusters.

16. The method set forth in claim 15, further comprising:

receiving a telephone call by the device on the first network directed to the first number associated with the mobile device; and routing the telephone call to the mobile device via the second telephone network to the second telephone number.

17. The method set forth in claim 16, further comprising concurrently routing the telephone call to a device associated with the first telephone number on the first telephone network.

* * * * *

UNITED STATES PATENT AND TRADEMARK OFFICE
CERTIFICATE OF CORRECTION

PATENT NO. : 9,049,292 B2  
APPLICATION NO. : 12/712754  
DATED : June 2, 2015  
INVENTOR(S) : Garg et al.

Page 1 of 1

It is certified that error appears in the above-identified patent and that said Letters Patent is hereby corrected as shown below:

In The Specification

In Description of Example Embodiments:

Column 8, Line 64, please insert --, represented by 610,-- after call;

Column 9, Line 5, please insert --(represented by 612, 614)-- after call;

Column 9, Line 5, please delete "ICM" and insert --IP-- therefor;

Column 9, Line 7, please insert --In particular embodiments, the call may be routed to a second phone 604 associated with the user coupled to home call cluster 110 (for example an office telephone) as represented by 616.-- after 102..

Signed and Sealed this  
Nineteenth Day of January, 2016

Michelle K. Lee  
*Director of the United States Patent and Trademark Office*